United States Patent Office 3,111,459
Patented Nov. 19, 1963

3,111,459
METHOD FOR PREPARATION OF INOSINE
Shinichi Motozaki, Tokyo, Toshinao Tsunoda, Zushi-shi, Kanagawa-ken, Ryohei Aoki, Tokyo, Shinji Okumura, Yokohama-shi, Kanagawa-ken, Yasuhiro Kondo, Kawasaki-shi, Kanagawa-ken, and Nobutoshi Muramatsu, Haruo Momose, and Yoshio Tamagawa, Tokyo, Japan, assignors to Ajinomoto Kabushiki Kaisha, Tokyo, Japan, a corporation of Japan
No Drawing. Filed Oct. 18, 1960, Ser. No. 63,241
Claims priority, application Japan Oct. 19, 1959
15 Claims. (Cl. 195—28)

This invention relates to methods for preparing inosine by fermentation.

More particularly, this invention relates to the preparation of inosine by the use of microorganisms, which preparation comprises cultivating a mutant of *Bacillus subtilis* which, for growth, requires both adenine and amino acid in its culture medium to which medium a carbon source is added which is a compound selected from the group consisting of saccharides, poly-alcohols and mixtures thereof, and to which a nitrogen source is added which is a compound selected from the group consisting of ammonium salts, nitrates, urea, ammonia and their analogues. The invention also contemplates the use of amino acids, adenine or their analogues, or natural substances containing the same, which additional substances are added as nutrients for the bacteria. The inosine is produced by fermentation under aerobic conditions, the pH value of the culture medium being maintained in the range of from 4 to 9, inosine being recovered from the resulting fermentation liquid.

An object of this invention is to provide an improved industrial process for preparing large amounts of inosine at low cost.

Prior methods for preparing inosine were processes wherein animal bodies and/or cells of microorganism were used as the raw material, and merely involved isolating inosine which was already present in the natural sources in free or combined forms.

In contrast thereto, according to this invention, inosine is produced and accumulated by using microorganisms.

The various conditions of the process of this invention are described below.

(1) Fermentation bacteria: The fermentation bacteria employed in this invention are the mutants of *Bacillus subtilis*, and the mutation is effected, for example, by ultraviolet-irradiation, X-ray-irradiation, or γ-ray-irradiation. Other methods may also be utilized.

Typical strains which can be used are S–26910 (ATCC No. 13956), No. 2411 (ATCC No. 13953), No. 1346 (ATCC No. 13952), $B_4$–$B_p11$ (ATCC No. 13954) and $B_1$–$B_p11$ (ATCC No. 13955), but many other mutants may also be used. These mutants are characterized by the facts that they are the poly-auxotrophic mutants. $B_4$–$B_p11$ is a mutant requiring adenine and histidine, $B_1$–$B_p11$ is a mutant requiring adenine, histidine and aspartic acid and S26910, No. 2411 and No. 1346 are also mutants requiring adenine and amino acids. Thus, in fermentation processes wherein these strains are used, it is necessary that such required substances be present in the culture medium.

(2) Carbon source: Any substances, which can be utilized as a carbon source by the fermentation bacteria of this invention, may be used alone or in mixtures.

The functions of carbon source are as follows: to form the constituents of vegetative cells of fermentative bacteria; to produce the energy for growth and fermentation; and to convert into ribose and hypoxanthine (the constituents of inosine).

The relationship between the different kinds of typical carbon sources and inosine productivity is shown in Table 1.

From this table, it becomes clear that glucose, fructose, mannose, galactose, xylose, arabinose, sucrose, starch hydrolyzate, soluble starch, molasses, glycerine, sorbitol, mannitol, ethylene glycol and the like may be used as the carbon source, i.e. one of the main materials for this invention.

TABLE 1

*Relation Between Various Carbon Sources and Inosine Productivity*

| Carbon source | Accumulated amount of inosine (g./dl.) | |
|---|---|---|
| | $B_4$–$B_p11$ | $B_1$–$B_p11$ |
| Glucose | 0.52 | 0.47 |
| Fructose | 0.49 | 0.34 |
| Mannose | 0.33 | 0.34 |
| Galactose | 0.15 | 0.09 |
| Xylose | 0.19 | 0.27 |
| Arabinose | 0.22 | 0.28 |
| Sucrose | 0.54 | 0.20 |
| Starch hydrolyzate | 0.59 | 0.48 |
| Soluble starch | 0.33 | 0.29 |
| Molasses | 0.23 | 0.25 |
| Glycerine | 0.34 | 0.33 |
| Sorbitol | 0.03 | 0.04 |
| Mannitol | 0.30 | 0.32 |
| Ethylene glycol | 0.05 | 0.04 |

The data shown above are the results that were obtained by using the mutants of the present invention in the following medium.

Culture medium:
- Carbon source _____ g./dl__ 10
- Amonium chloride _____ g./dl__ 2.0
- Dry yeast _____ g./dl__ 1.4
- Solution of amino acids mixture prepared from soybean meal acid hydrolyzation (total nitrogen 2.4 g./dl) _____ g./dl__ 0.4
- $KH_2PO_4$ _____ g./dl__ 0.8
- $MgSO_4 \cdot 7H_2O$ _____ g./dl__ 0.04
- Fe ion _____ p.p.m__ 2
- Mn ion _____ p.p.m__ 2
- pH _____ 7.0
- $CaCO_3$ _____ g./dl__ [1] 2.0

[1] Sterilized separately.

The culture was subjected to shaking at 30° C. for three days.

TABLE 2
*Inosine Production From Pentose*

| Saccharide | Additive to medium (ml./dl.) | | Accumulated amount of inosine (g./dl.) | |
| --- | --- | --- | --- | --- |
| | Solution of amino acids mixtures prepared from soybean meal acid hydrolyzation | Corn steep liquor | No. 1346 | No. 2411 |
| Xylose | 1.2 | 0 | 0.29 | 0.33 |
| Do | 1.2 | 0.2 | 0.28 | 0.37 |
| Arabinose | 0.4 | 0 | 0.28 | 0.22 |
| Do | 0.4 | 0.2 | 0.31 | 0.26 |

*Note.*—Composition of the culture medium employed is as follows:

Carbon source _____g./dl__ 10
$KH_2PO_4$ _____g./dl__ 0.8
$MgSO_4 \cdot 7H_2O$ _____g./dl__ 0.04
Fe ion _____p.p.m__ 2
Mn ion _____p.p.m__ 2
Ammonium chloride _____g./dl__ 2
Dry Yeast _____g./dl__ 1.4
pH _____ 7.0
$CaCO_3$ _____g./dl__ [1] 2

[1] Sterilized separately.

The culture was subjected to shaking at 30° C. for three days.

(3) Nitrogen source: As the nitrogen source, inorganic and organic ammonium salts, urea, nitrates, and ammonia, etc. may be utilized. The total amount of the nitrogen source may be added to the medium at the beginning of cultivation, or a part of the nitrogen source may be added during the cultivation. Ammonia is added while the pH value is controlled during the fermentation. Furthermore, the amounts of nitrogen source to be added depend on the kinds of nitrogen source, and the kinds and the concentration of the carbon source. Cheaper inorganic ammonium salts, such as ammonium chloride, ammonium sulfate, ammonium nitrate, ammonium phosphate, and urea, etc. are usually used in an amount of about 0.5 g./dl. to 2.5 g./dl. The relationship between the nitrogen sources and inosine productivity is illustrated in Table 3. Such nitrogen sources may be used alone or in mixtures. In addition, it is shown in Table 4 that the added amount of nitrogen source influences inosine productivity strongly. Thus, it is understood that the inosine production does not occur on a large scale and that the ammonia is not introduced into the hypoxanthine if considerable amounts of ammonia are not present in the medium.

TABLE 3
*Relation Between Various Nitrogen Sources and Inosine Productivity*

| Nitrogen source | g./dl. | Accumulated amount of inosine (g./dl.) | |
| --- | --- | --- | --- |
| | | $B_4-B_p11$ | $B_1-B_p11$ |
| Ammonium chloride | 1.5 | 0.46 | 0.29 |
| Ammonium nitrate | 1.5 | 0.46 | 0.38 |
| Ammonium sulfate | 1.5 | 0.49 | 0.38 |
| Ammonium phosphate | 1.5 | 0.39 | 0.38 |
| Potassium nitrate | 1.5 | 0.18 | 0.41 |
| Sodium nitrate | 1.5 | 0.12 | 0.36 |
| Urea | 0.75 | 0.43 | 0.37 |
| Mixture of: | | | |
| Ammonium chloride | 0.75 | 0.53 | 0.59 |
| and Urea | 0.38 | | |

*Note.*—Composition of the culture medium employed is as follows:

Starch hydrolyzate _____g./dl__ 10
Nitrogen source _____ As described above
Yeast extract _____g./dl__ 1.0
Corn steep liquor _____g./dl__ 0.3
Casein hydrolyzate _____g./dl__ 0.1
Sodium ribonucleate _____g./dl__ 0.01
$KH_2PO_4$ _____g./dl__ 0.8
$MgSO_4 \cdot 7H_2O$ _____g./dl__ 0.04
Fe ions _____p.p.m__ 2
Mn ions _____p.p.m__ 2
pH _____ 7.0
$CaCO_3$ (sterilized separately) ____g./dl__ 2

The culture was subjected to shaking at 30° C. for three days.

TABLE 4
*Relation Between the Amount of Nitrogen Source Used and Inosine Productivity*

| Ammonium chloride (g./dl.) | Accumulated amount of inosine (g./dl.) | |
| --- | --- | --- |
| | $B_4-B_p11$ | $B_1-B_p11$ |
| 0.02 | 0.05 | 0.04 |
| 0.20 | 0.11 | 0.07 |
| 0.50 | 0.32 | 0.24 |
| 2.00 | 0.42 | 0.33 |

*Note.*—The basal medium, except the nitrogen source, is the same as described in Table 3.

(4) Nutrition of fermentation bacteria: For high accumulation and excretion of inosine, it is necessary that the specific nutrient circumstances are given to make the bacteria active in fermentation. The term "nutrient" described above does not mean such as the carbon source or nitrogen source. We have carried out the experiments shown in Table 5 and examined the nutrients, which may be nutrients for the fermentation bacteria and also have the effect of increasing inosine production and accumulation. As a result, it was found that the most effective nutrients were dry yeast and yeast extract, and moreover a considerable amount of inosine was produced and accumulated only by addition of the optimum amount of the nutrients.

In addition to the above nutrients, the auxiliary addition of meat extract, casein hydrolyzate, polypeptone, NZ amine and corn steep liquor was effective. But these substances are complexes which contain various nutrients. Therefore, with regard to the synthetic medium, we investigated what were the simple essential nutrients which were effective for both growth and accumulation.

As a result, it has been found that the essential nutrients are adenine and amino acids. These results are shown in Table 5.

TABLE 5
*Relation Between the Nutrients and Inosine Productivity*

| Nutrient | (g./dl.) | Accumulated amount of inosine | |
| --- | --- | --- | --- |
| | | $B_4-B_p11$ | $B_1-B_p11$ |
| No addition | | 0.00 | 0.00 |
| Dry yeast | 0.01 | 0.00 | 0.00 |
| | 0.10 | 0.05 | 0.01 |
| | 1.80 | 0.57 | 0.48 |
| Yeast extract | 0.01 | 0.02 | 0.01 |
| | 0.10 | 0.03 | 0.01 |
| | 0.60 | 0.23 | 0.22 |
| | 1.00 | 0.42 | 0.34 |
| Meal extract | 0.10 | 0.02 | 0.00 |
| | 1.00 | 0.05 | 0.03 |
| Casein hydrolyzate | 0.10 | 0.00 | 0.01 |
| | 1.00 | 0.01 | 0.00 |

TABLE 6

*Relation Between Adenine and Amino Acids and Inosine Productivity*

| Adenine (mg./dl.) | Amino acids addition | Accumulated amount of inosine by mutants of Bacillus subtilis | | | | | |
|---|---|---|---|---|---|---|---|
| | | $B_4$–$B_p11$ | | | $B_1$–$B_p11$ | | |
| | | Growth | pH | Inosine (g./dl.) | Growth | pH | Inosine (g./dl.) |
| 0 | – | ± | 7.8 | 0.00 | ± | 7.2 | 0.00 |
| 0 | + | ± | 7.8 | 0.00 | ± | 7.2 | 0.00 |
| 0.15 | + | ± | 7.5 | 0.00 | + | 7.2 | 0.00 |
| 1.5 | + | + | 7.3 | 0.02 | + | 7.0 | 0.02 |
| 5.0 | + | ++ | 5.2 | 0.17 | ±± | 6.5 | 0.09 |
| 15.0 | + | ++ | 5.0 | 0.15 | ++ | 5.4 | 0.21 |
| 45.0 | + | +++ | 5.0 | 0.12 | +++ | 5.3 | 0.13 |
| 15.0 | – | ± | 7.5 | 0.04 | ± | 7.0 | 0.03 |

Note.—Amino acids (mg./dl.):
(1) In the case of $B_4$–$B_p11$ strain: histidine 30, glycine 10, lysine 30, glutamic acid 10, methionine 30, cystine 30, valine 30.
(2) In the case of $B_1$–$B_p11$ strain: hitidine 50, aspartic acid 50, glycine 30, lysine 30, phenylalanine 10, tyrosine 30, leucine 30, isoleucine 30, threonine 30, valine 10, alanine 10, proline 10, arginine 10.

Although such combinations of amino acids are favorable for large production of inosine, the essential amino acids required for growth are histidine for strain $B_4$–$B_p11$, and histidine plus aspartic acid for $B_1$–$B_p11$.

With regard to the amount of adenine added, there is an optimum amount for the production of insosine. In an excess of adenine, the bacteria grow uselessly and the production and accumulation of inosine are reduced, and in insufficient amount of adenine the production of insosine is also reduced.

Yeast extracts and dry yeast can be utilized as a source of adenine and amino acids, and these substances are also favorable for the production of inosine. It is preferred for industrial production that adenine, amino acids or their analogues, or natural substances containing them, such as yeast extract, dry yeast or the cells of other microorganisms be used alone or in mixtures.

(5) Effect of aeration: When a mutant of *Bacillus subtilis*, which is capable of producing inosine, is inoculated and cultured in a medium, little inosine is produced unless a large quantity of oxygen is supplied to the culture medium. For example, when the culture medium as described above is placed in a flask and static culture is carried out, there is an appearance of growth but the amount of inosine accumulated is negligible.

However, when the above flask is shaken on a shaker for causing effective supply of the air, the amount of inosine produced is increased remarkably. The degree of this aeration is closely related to the production of inosine, and it appears that rather strong aeration is essential.

The relationship between aeration and inosine productivity was examined by experiments in which the volume of the culture medium in the shaking flask was varied. The results are shown in Table 7.

TABLE 7

*Relation Between the Aeration and the Amount of Inosine Produced*

| Oxygen absorption coefficient (kd.) | Volume of the culture medium in 500 ml. flask (ml.) | Aeration | Amount of inosine produced (g./dl.) |
|---|---|---|---|
| 7 × 10⁻⁶ | 20 | strong | 0.65 |
| 5.8 × 10⁻⁶ | 40 | ↓ | 0.66 |
| 4.3 × 10⁻⁶ | 80 | ↓ | 0.59 |
| 3.3 × 10⁻⁶ | 160 | weak | 0.16 |

Note.—The above culture is carried out at 30° C.

(6) pH control on fermentation: If a mutant of *Bacillus subtilis*, which is capable of producing inosine, is inoculated in a medium containing glucose, ammonium chloride, yeast extract and inorganic salts, and cultured aerobically, little inosine is produced without pH control of the medium. The production and accumulation of inosine take place smoothly only when the pH value of the culture medium is controlled to maintain the optimum range.

The pH range for the production of inosine is from 4 to 9, and beyond the limits of the above range, inosine is not produced at all. It is at a pH value of from 5 to 7 that the production and accumulation of inosine occur exceptionally. As neutralizing agents which can be used to control the pH value, calcium carbonate, ammonia, potassium hydroxide, sodium hydroxide or other alkalis, or acids are available.

The results of pertinent experiments are listed in Table 8. In these experiments, at the beginning, a neutralizing agent, e.g. calcium carbonate, was added in an amount of 2 g./dl. to the culture medium, and to control and maintain a pH value at 3, 4, 5, 6, 7, 8 and 9 respectively, the concentrated solution of phosphoric acid or ammonia was added directly to the culture as required.

The pH value in the uncontrolled areas was retained throughout the cultivation in the range of 6.7 to 5.0, which was the optimum pH range for the production of inosine, by the presence of calcium carbonate.

TABLE 8

*Relation Between the pH Value and Inosine Productivity*

| | pH | The amount of inosine accumulated (g./dl.) |
|---|---|---|
| Areas controlled by phosphoric acid and ammonia. | 2.5–3.4 | 0.05 |
| | 3.5–4.5 | 0.12 |
| | 4.9–5.1 | 0.51 |
| | 5.8–6.2 | 0.51 |
| | 6.8–7.2 | 0.55 |
| | 7.8–8.2 | 0.13 |
| | 8.9–9.1 | 0.17 |
| Uncontrolled areas | 6.7–5.0 | 0.49 |

(7) Recovery of inosine: Inosine accumulated in a fermentation liquid may be isolated by removing the cells from the resulting fermentation liquid, collecting the relatively pure inosine containing solution from the resulting clear fermentation liquid, for instance, by both the ion exchange resin treatment and the adsorbent treatment, concentrating the above solution under vacuum, and then precipitating the inosine crystals by adding hydrophilic and inosine-insoluble solvents such as acetone to the concentrated liquid.

EXAMPLE 1

3 ml. portions of a culture medium consisting of glucose 5 g./dl., ammonium chloride 0.4 g./dl., urea 0.4 g./dl., $KH_2PO_4$ 0.1 g./dl., $MgSO_4 \cdot 7H_2O$ 0.02 g./dl., $Mn^{++}$ 2 p.p.m., $Fe^{++}$ 2 p.p.m., casein hydrolyzate 0.2 g./dl., yeast extract 0.2 g./dl., corn steep liquor 0.2 ml./dl., polypeptone 0.1 g./dl., meat extract 0.1 g./dl. and sodium ribonuleate 10 mg./dl. were poured into respective test tubes and each tube was sterilized at 115° C. for ten minutes. Thereafter separately sterilized calcium carbonate was added in the amount of 2 g./dl. and then cells of *Bacillus subtilis* S26910 were inoculated into the above media and cultured with shaking at 30° C. for 20 hours.

The resulting culture liquids were utilized for seeding. 20 ml. of the medium having the composition described above were poured into a 500 ml. shaking flask and sterilized at 115° C. for 10 minutes and five drops of the above seed were added, and then cultured with shaking at 30° C. for 65 hours. Thereafter 0.15 g./dl. of inosine were accumulated.

The inosine containing solution, which was obtained by separating the cells from the resulting fermentation liquid, was treated with both decolorizing resins and anion exchange resins by means of a conventional method and then acetone was added to crystallize the inosine. 1.47 g. of the crude crystals of inosine were obtained from 3.5 litre of the culture liquid containing 1 g. of inosine per liter.

EXAMPLE 2

The seed of *Bacillus subtilis* No. 2411 was cultured at 37° C. for 20 hours on a solid medium containing meat extract 1 g./dl., polypeptone 1 g./dl., sodium chloride 0.5 g./dl., yeast extract 0.1 g./dl., casein hydrolyzate 0.1 g./dl., sodium ribonucleate 50 mg./dl. and agar 2 g./dl. in a Roux-flask. The main culture medium was prepared as follows: 20 ml. of the medium containing xylose 10 g./dl., $KH_2PO_4$ 0.8 g./dl., $MgSO_4 \cdot 7H_2O$ 0.04 g./dl., Fe ions 2 p.p.m., Mn ions 2 p.p.m., ammonium chloride 2 g./dl., dry yeast 1.4 g./dl., solution of amino acids mixture 1.2 ml./dl. and corn steep liquor 0.2 ml./dl., were sterilized at 110° C. for 10 minutes in 500 ml. shaking flasks and then 2% of calcium carbonate, sterilized separately, was added to the medium. The fermentation was conducted at 30° C. for 3 days under aerobic conditions. 3.5 g./l. of inosine were accumulated.

By removing the cells from 1 litre of the above fermentation liquid, recovering the inosine containing fractions by using an ion exchange resin, Dowex-I (formic acid type) and active carbon as an adsorbent, concentrating the resulting inosine containing fractions, and then adding an inosine-insoluble solvent, e.g. acetone, to the above concentrated solution, crude crystals of inosine in an amount of 1.8 g. were obtained.

EXAMPLE 3

One litre of a medium was prepared for a main culture with dry yeast 1.4 g./dl., a solution of amino acids mixture 0.4 ml./dl., $KH_2PO_4$ 0.8 g./dl., $MgSO_4 \cdot 7H_2O$ 0.04 g./dl., Fe ions 2 p.p.m., Mn ions 2 p.p.m. and ammonium chloride 2.2 g./dl. to 5 g./dl. of the wood hydrolyzate having pentose and hexose in a ratio of about 30:70 as reducing sugars. Seed obtained, as described in Example 2, was added into the above medium, and cultured at 30° C. under aerobic conditions. 3 g. of inosine per litre were accumulated after 3 days. Then, 1.4 g. of inosine was obtained from the fermentation liquid by the same procedure as described in Example 2.

EXAMPLE 4

The procedure described in Example 3 was followed, except refined pulp waste liquor with a ratio of pentose to hexose of about 75:25 was used in place of the wood hydrolyzate as the carbon source. 2.5 g. of inosine per litre were accumulated after 3 days, and therefrom 1.2 g. of inosine was obtained.

What is claimed is:

1. A method for the preparation of inosine from microorganisms comprising providing a microorganism which is a polyauxotrophic mutant of *Bacillus subtilis* capable of producing inosine and requiring both amino acids and a member selected from the group consisting of adenine and its derivatives, culturing said microorganism under aerobic conditions in a culture medium satisfying the requirements of the *Bacillus subtilis,* said culture medium consisting essentially of a carbon source selected from the group consisting of carbohydrates and poly alcohols; a nitrogen source selected from the group consisting of ammonium salts, nitrates, urea and ammonia; an adenine providing substance selected from the group consisting of adenine and its derivatives and natural substances containing adenine and its derivatives; amino acids, and inorganic salts, maintaining the pH value of the culture medium between about 4 and 9 and maintaining the temperature of the culture medium between about 25° C., and 40° C. during fermentation, and recovering inosine from the resulting fermentation liquid.

2. A method as claimed in claim 1 wherein the step of recovering the inosine from the fermentation liquid comprises separating the cultured mutant from the resulting fermentation liquid, the fermentation liquid including an inosine solution, collecting the inosine solution from the fermentation liquid by ion exchange resin treatment, and precipitating inosine from the inosine solution by adding a solvent thereto, the solvent being selected from the group consisting of acetone, ethanol, and methanol.

3. A method as claimed in claim 1 wherein the step of recovering the inosine from the fermentation liquid comprises separating the cultured mutant from the resulting fermentation liquid, the fermentation liquid including an inosine solution, collecting the inosine solution from the fermentation liquid by absorption using active carbon, and precipitating inosine from the inosine solution by adding a solvent thereto, the solvent being selected from the group consisting of acetone, ethanol and methanol.

4. A method according to claim 1, wherein mutant of *Bacillus subtilis* is one of the group consisting of ATCC Nos. 13952 to 13956, inclusive.

5. A method according to claim 1, wherein the carbohydrates are selected from the group consisting of glucose, fructose, mannose, galactose, xylose, arabinose, sucrose, starch hydrolyzate, soluble starch, molasses, wood hydrolyzate and pulp waste liquor.

6. A method according to claim 1, wherein polyalcohols selected from the group consisting of glycerine, ethylene glycol, mannitol and sorbitol are utilized as the carbon source.

7. A method according to claim 1 which comprises using nitrogen-containing substances selected from the group $NH_4Cl$, $(NH_4)_2SO_4$, $NH_4NO_3$, $NH_4H_2PO_4$, $NH_3$, urea, $KNO_3$ and $NaNO_3$ as the nitrogen source.

8. A method according to claim 1 which comprises using nutrient substances selected from the group consisting of dry yeast, yeast extract, dies yeast, meat extract, casein hydrolyzate, polypeptone, corn steep liquor and sodium ribonucleate as a nutriment.

9. A method according to claim 1, wherein amino acid providing substances selected from the group consisting of histidine, aspartic acid, lysine, methionine, cystine, valine, glycine, tyrosine, leucine, isoleucine, theonine, tryptophane, proline, arginine, phenylalanine, serine, alanine, proline, arginine and glutamic acid, are added to the medium.

10. A method according to claim 1, wherein magnesium sulfate, potassium of phosphoric acid, manganese compounds and iron compounds are used as said inorganic salts.

11. A method according to claim 1, wherein neutralizing agents selected from the group consisting of $NH_3$, $CaCO_3$, KOH and NaOH, are used to control the pH of the medium.

12. A method according to claim 1, wherein aerobic conditions are obtained by aeration and agitation of the culture medium.

13. A method according to claim 1, wherein aerobic conditions are obtained by shaking the culture medium.

14. A method for the preparation of inosine comprising culturing an artificially induced mutant of *Bacillus subtilis* having the capacity of producing extra-cellular inosine in a culture medium and providing a growth in response to the addition of adenine and at least one amino acid selected from the group consisting of histidine, aspartic acid, lysine, methionine, cystine, valine, glycine, tyrosine, leucine, isoleucine, threonine, tryptophane, proline, arginine, phenylalanine, serine, alanine, and glutamic acid, culturing said microorganism under aerobic conditions in a culture medium containing a carbon source selected from the group consisting of carbohydrates and polyalcohols; a nitrogen source selected from the group consisting of ammonium salts, nitrates, urea and ammonia; a nutrient selected from the group consisting of an adenine and its derivatives and natural substances containing adenine and its derivatives; natural proteinous amino acids and inorganic salts, maintaining the pH value of the culture medium between about 4 and 9 and maintaining the temperature of the culture medium between about 25° C. and 40° C. during fermentation, and recovering inosine from the resulting fermentation liquid.

15. A method for the preparation of inosine from microorganisms comprising providing a microorganism which is a poly-auxotrophic mutant of *Bacillus subtilis* capable of producing inosine and requiring a member selected from the group consisting of adenine and its derivatives and at least one amino acid selected from the group consisting of histidine, aspartic acid, lysine, methionine, cystine, valine, glycine, tyrosine, leucine, isoleucine, threonine, tryptophane, proline, arginine, phenylalanine, serine, alanine and glutamic acid, culturing said microorganism under aerobic conditions in a culture medium satisfying the requirements of the *Bacillus subtilis*, said culture medium consisting essentially of a carbon source selected from the group consisting of carbohydrates and polyalcohols; a nitrogen source selected from the group consisting of ammonium salts, nitrates, urea and ammonia; an adenine providing substance selected from the group consisting of adenine and its derivatives and natural substances containing adenine and its derivatives; amino acids, and inorganic salts, maintaining the pH value of the culture medium between about 4 and 9 and maintaining the temperature of the culture medium between about 25° C. and 40° C. during fermentation, and recovering inosine from the resulting fermentation liquid.

References Cited in the file of this patent
UNITED STATES PATENTS
2,942,977   Lewis et al. _____ June 28, 1960